United States Patent Office 3,303,242
Patented Feb. 7, 1967

3,303,242
POLYMETHYL-METHACRYLATE-MODIFIED MIXTURES OF A STYRENE-ACRYLONITRILE COPOLYMER AND BUNA N RUBBERS
Giuseppe Guzzetta, Milan, and Enrico Orsatti, Busto Arsizio, Italy, assignors to Montecatini Edison S.p.A., Milan, Italy
No Drawing. Filed Sept. 15, 1964, Ser. No. 396,731
Claims priority, application Italy, Apr. 6, 1961, 6,304/61
4 Claims. (Cl. 260—887)

This is a continuation-in-part of our application Serial No. 184,934, filed April 4, 1962, now abandoned, and relates to new and improved thermoplastic compositions based on copolymers of acrylonitrile with styrene and butadiene and of methylacrylate, which compositions have very good and even excellent characteristics in respect to all of the following properties simultaneously: toughness and impact resistance, hardness, rigidity and heat resistance.

According to previous methods, thermoplastic compositions are prepared by copolymerization of styrene, acrylonitrile and butadiene or, more generally, by mixing styrene-acrylonitrile (SN) copolymers and butadiene-acrylonitrile copolymers (BN). In formulation of said compositions, the purpose was to try to couple the high mechanical and thermal characteristics of or due to or ascribed to the SN-copolymer with the high resiliency due to the BN-copolymer. However, it is impossible by such methods to embody or couple all of said characteristics to a high degree in a single mixture, since the said characteristics becomes antagonistic or detrimental to each other, according to the percentage of SN and BN present in the mixture.

The applicants have now found, surprisingly, that by partially replacing the styrene-acrylonitrile copolymer with polymethylmethacrylate, in the mixes, thermoplastic compositions are obtained having both excellent mechanical and thermal characteristics, together with high resiliency.

An object of this invention is therefore to couple, in a single composition, excellent resiliency, hardness, rigidity and heat-resistance properties.

Another object of this invention is improvement of the injection moulding procedure, as compared with compositions obtained by previous methods. More particularly, in our compositions we avoid the phenomenon of spottings, similar to flow lines. The spottings are readily evident in the moulded pieces near the injection nozzle, possibly being due to changes or alterations in the BN rubber.

Other objects of our invention are to give, to the manufactured finished articles obtained with our compositions, an appearance, transparence and light fastness which excel those of manufactured articles prepared from previously known compositions.

These objects are attained by partially substituting polymethylmethacrylate for styrene-acrylonitrile copolymer, in the mixes with the butadiene-acrylonitrile copolymer.

Corresponding compositions can be obtained, according to the present invention, by copolymerizing a mixture of styrene, acrylonitrile, butadiene and methylmethacrylate monomers, or preferably by mixing copolymers SN and BN with polymethylmethacrylate (PMM).

The new compositions are preferably obtained by homogeneously mixing 10 to 80 parts by weight of the butadiene-acrylonitrile (BN) copolymer with 70 to 90 parts by weight of a mixture consisting of polymethylmethacrylate (PMM) and styrene-acrylonitrile copolymer (SN), which may contain 20–50% of PMM.

Furthermore, 0.5–1.5% by weight of a rubber antioxidant, calculated in respect to the copolymer BN, and 1–2% of a lubricant to make the moulding easier, are added to the above-mentioned mixture, besides the necessary dyestuffs.

The homogeneous mixing is generally carried out at temperatures between 120 and 200° C., preferably between 150 and 180° C., in Banbury mixers. Any other known type of mixer may be employed, such as roll mixers and extruders.

The product thus homogenized is then granulated and moulded according to the methods commonly used for thermoplastic materials.

Only for the purpose of illustrating, but not to limit the invention, the inventors report a number of examples, which are listed in the following table.

TABLE 1

| Example No. | Composition of the mixture, percent | | | | | Physical characteristics | | | | |
|---|---|---|---|---|---|---|---|---|---|---|
| | Copolymer styrene-acrylonitrile,[1] | Copolymer butadiene-acrylonitrile,[2] | Poly-methyl-methacrylate,[3] | Lubricant | Anti-oxidant | Izod impact strength, notched, kg. cm./cm. of notch[4] | Hardness, Rockwell scale R[5] | Heat distortion,[6] ° C. | Flexural Modulus,[7] kg./cm.[2] | Light transmission,[8] percent |
| 1 | 70.5 | 27 | | 2 | 0.5 | 20–25 | 93–95 | 78–80 | 18,000 | 15 |
| 2 | 47.5 | 20.5 | 29.5 | 2 | 0.5 | 20–25 | 105–106 | 87 | 22,000 | 32 |
| 3 | 77 | 20.5 | | 2 | 0.5 | 3 | 104–105 | 83 | 22,000 | 16 |
| 4 | 73.5 | 24 | | 2 | 0.5 | 20–25 | 93–94 | 87 | 18,000 | 15 |
| 5 | 58.5 | 19.5 | 19.5 | 2 | 0.5 | 20–25 | 104–106 | 90 | 21,000 | 33 |
| 6 | 78 | 19.5 | | 2 | 0.5 | 15 | 100 | 89 | 20,000 | 16 |

[1] Composition of the copolymer styrene-acrylonitrile: 72.5% styrene-27.5% acrylonitrile.
[2] Composition of the copolymer butadiene-acrylonitrile: in the experiments 1, 2 and 3: 60% butadiene, 40% acrylonitrile; in the experiments 4, 5 and 6: 80% butadiene, 20% acrylonitrile.
[3] Molecular weight between 80,000 and 100,000, and preferably between 84,000 and 86,000.
[4] Determined according to ASTM D 256.
[5] Determined according to ASTM D 785.
[6] Determined according to ASTM D 648.
[7] Determined according to ASTM D 790.
[8] On plate specimens of 1.1 mm., with white light.

Example 2 of Table 1

A copolymer of 72.5% by weight styrene and 27.5% acrylonitrile is homogeneously mixed with a copolymer of 60% butadiene, 40% acrylonitrile, and with polymethylmethacrylate. The three components are in the weight ratio of 47.5 to 20.5 to 29.5. Two parts of a synthetic wax, such as "Syntewax," available from Comiel (Milan, Italy) and described in their bulletin IN/61, are added as lubricant and 0.5 part of "2246"—2,2 methylene-bis (4 methyl-6-tert. butylphenol), "Rubber Chemicals," Alphen, I. page 69 (1956)—are added as antioxidant. The mixing is carried out at a temperature of 180° C.

The homogenized mixture is then injection-molded as follows.

Screw injection machine, "Ankerwerke 200":

| | |
|---|---|
| Rear cylinder, ° C. | 160 |
| Center cylinder, ° C. | 180 |
| Front cylinder, ° C. | 195 |
| Nozzle, ° C. | 195 |
| Mold, ° C. | 60 |
| Pressure, kg./cm.², g. | [1] 70 |
| Total cycle, seconds | 40 |
| Screw-ram forward time, seconds | 16 |
| Dwell time, seconds | 10 |
| Mold closed time, seconds | 15 |
| Mold open time, seconds | 9 |

[1] Max.

On the injection-molded specimens we have found the physical data reported in Table 1.

We claim:

1. A thermoplastic composition comprising 10 to 30% of a butadiene-acrylonitrile copolymer in a butadiene/acrylonitrile ratio of 60 to 80%/40 to 20%, 17 to 72% of a styrene-acrylonitrile copolymer in a styrene/acrylonitrile ratio of 72.5%/27.5%, and 14 to 72% of polymethylmethacrylate having toughness, rigidity, hardness and heat resistant properties.

2. A thermoplastic composition comprising 18–20% butadiene-acrylonitrile copolymer in a butadiene/acrylonitrile ratio of 60 to 80%/40 to 20%, 50–60% styrene-acrylonitrile copolymer in a styrene/acrylonitrile ratio of 72.5%/27.5%, and 20–30% polymethylmethacrylate.

3. A thermoplastic composition comprising 10 to 30% of a butadiene-acrylonitrile copolymer, wherein said butadiene-acrylonitrile copolymer contains 60 to 80% of butadiene, 40 to 90% of a styrene-acrylonitrile copolymer, wherein said styrene-acrylonitrile copolymer contains 72.5% of styrene, and 14 to 72% of polymethylmethacrylate.

4. A process of making a thermoplastic resin comprising the steps of homogeneously mixing, at a temperature between 120 and 200° C., 10 to 30% of a butadiene-acrylonitrile copolymer in a butadiene/acrylonitrile ratio of 60 to 80%/40 to 20%, 14 to 72% of a styrene-acrylonitrile copolymer in a styrene/acrylonitrile ratio of 72.5%/27.5%, and 14 to 72% of polymethylmethacrylate, and molding the mixture.

References Cited by the Examiner

UNITED STATES PATENTS

| | | | |
|---|---|---|---|
| 2,413,259 | 12/1946 | Soday | 260—887 |
| 2,698,313 | 12/1954 | Daly | 260—893 |

FOREIGN PATENTS 1,220,580  1/1960  France.

MURRAY TILLMAN, *Primary Examiner.*

J. L. WHITE, *Assistant Examiner.*